UNITED STATES PATENT OFFICE.

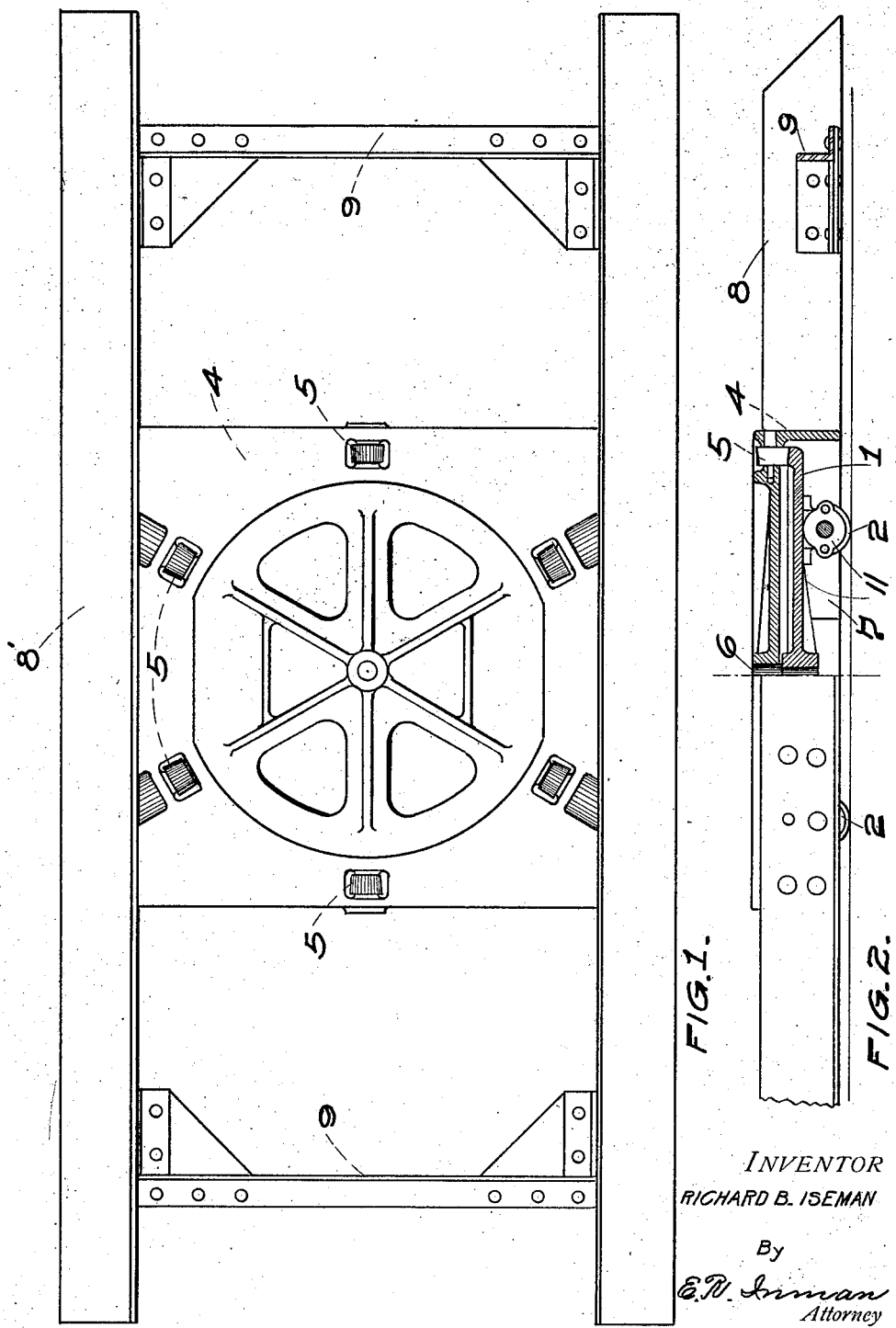

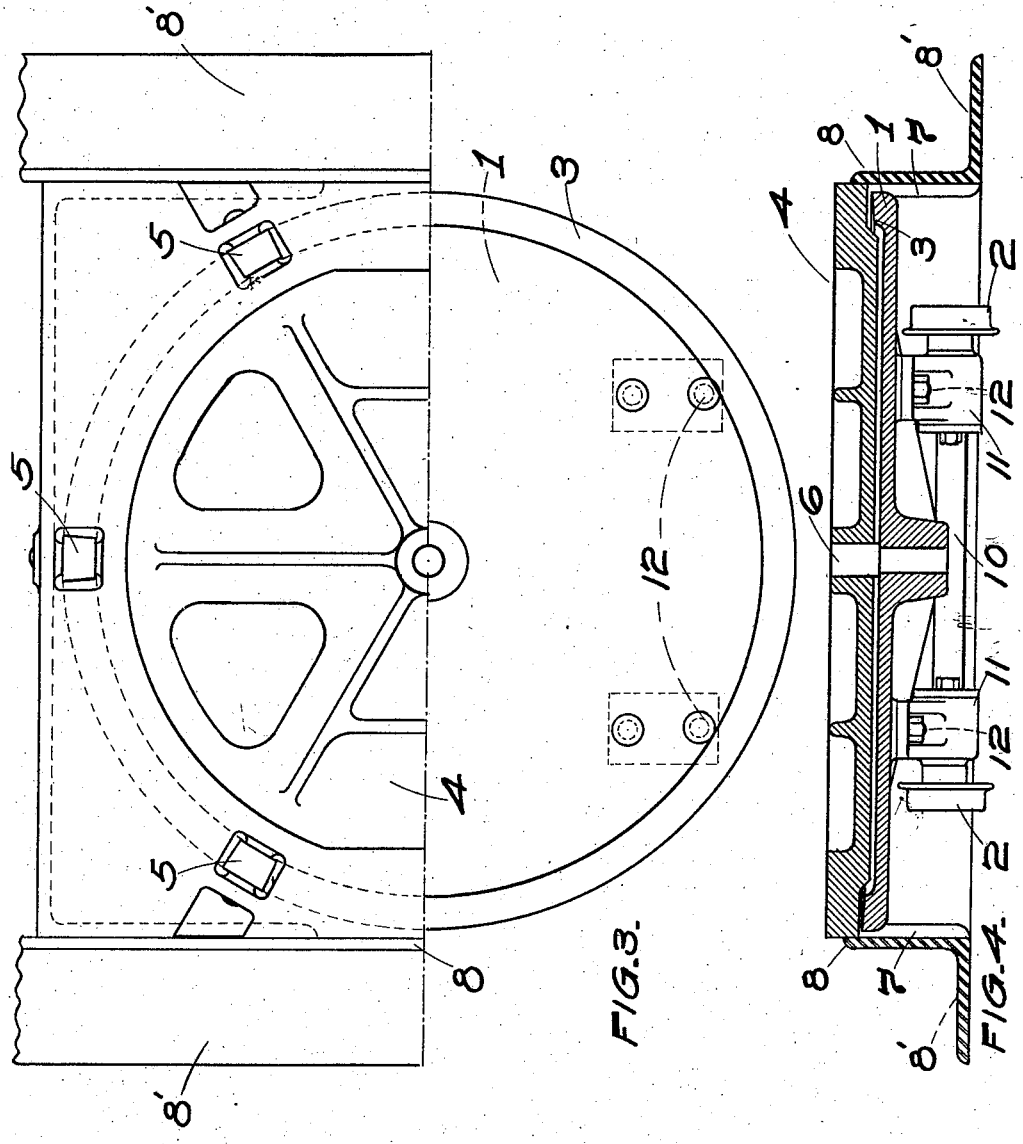

RICHARD B. ISEMAN, OF CLARION, PENNSYLVANIA.

TRAVELING AUTOMOBILE TURN-TABLE.

1,313,486. Specification of Letters Patent. Patented Aug. 19, 1919.

Application filed September 13, 1918. Serial No. 253,952.

*To all whom it may concern:*

Be it known that I, RICHARD B. ISEMAN, citizen of the United States, residing at Clarion, in the county of Clarion and State of Pennsylvania, have invented certain new and useful Improvements in Traveling Automobile Turn-Tables, of which the following is a specification.

This invention relates to new and useful improvements in automobile turn tables, the construction and operation of which are herein set forth with sufficient clearness to enable those skilled in the art to which it relates to make and use the same, reference being had to the accompanying drawings, the various figures of which are as follows:

Figure 1 is a plan view of my complete turntable.

Fig. 2 is a side elevation partly in central vertical section.

Fig. 3 is a plan view with one-half of the turret removed to expose the base to view.

Fig. 4 is a central, vertical, transverse section of the turn-table.

The construction here shown is substantially as follows:

A circular base 1 is provided upon its under side with wheels 2 which are preferably suitable for traveling upon rails of a common type, (not shown), though said wheels may, if desired, be suitable for traveling upon a plane surface, such as the usual floor; they are mounted within the circumference of said base 1.

It will be readily understood that said wheels 2 are adapted to effect the mobility of my improved turn table, and they are, therefore, referred to in the claims as mobility wheels, to clearly differentiate them from the rollers or wheels upon which the revolving elements, or in this case, the turret is carried.

Said mobility wheels 2 constitute the only supporting means for said base and the superstructure carried thereby, and are so disposed as to prevent any lateral or longitudinal tilting movement of said base and superstructure.

A narrow portion of said base, from the periphery inward, is formed into a race or track 3, for a purpose which will presently appear.

Revolubly mounted upon said base 1 is a rectangular turret 4 which is provided with rollers 5 traveling upon said track 3, and upon which rollers said turret is supported and adapted to revolve freely, and also for the purpose of preventing said turret from having any tilting movement upon said base. A central pivot 6, rigidly carried by said base 1 extends through said turret, at the center thereof, for the purpose of preventing relative displacement of said base and said turret.

The sides of said turret, especially two opposite sides, are formed into vertical downwardly-extending flanges, the outer faces of which are outside the periphery of said base. To said two opposite sides carriers 8 are directly attached, one upon each side, which lie parallel to each other. The distance between said carriers and the length thereof is such as to receive and carry the wheels of an automobile with the complete structure carried by said wheels.

Structural steel angles are preferably utilized for said carriers and they may be directly attached to said turret in any suitable way, as by rivets, bolts or by a welding process.

The wheel-base, or tread-surface 8' of said carriers, is positioned below the upper surface of said base and is in close proximity to the surface of the floor upon which the turntable travels so that an automobile may be easily run upon the same.

Said carriers 8, adjacent to each end thereof, are preferably connected by means of braces 9 to secure proper rigidity and strength of the structure.

Said wheels 2 are mounted upon an axle 10, for which, suitable bearings 11 are provided, said bearings being attached to base 1 by means of flat-head screws or bolts 12. Four wheels 2 are provided.

Said turret, with its attached carriers, is free to revolve upon said base, and an automobile carried by my improved traveling turn table may be swiveled or turned to any desired direction and removed therefrom thus facilitating the storage of the automobile.

My improved traveling turn table, constructed as above set forth, is designed to be used in garages and automobile repositories to facilitate the placing and repositing of automobiles, especially in rooms or buildings where the space is so restricted as to make it difficult to negotiate the vehicle into the desired space by means of its own power and steering gear.

I claim the following:

1. A traveling automobile turn table comprising in combination, a circular base, mobility wheels carrying and fully supporting said base, a rectangular turret revolubly mounted upon said base, and automobile carriers carried by said turret and fully supported thereby.

2. A traveling automobile turn table comprising in combination, a circular base, mobility wheels for said base positioned within the circumference thereof fully supporting said base and disposed to prevent a tilting movement thereof, a rectangular turret revolubly mounted upon said base, and carriers for an automobile carried directly by said turret.

3. A traveling automobile turn table comprising in combination, a circular base, mobility wheels for said base positioned within the circumference thereof disposed to prevent a tilting movement of said base, and the superstructure carried thereby, a turret revolubly mounted upon said base, and automobile carriers carried directly by said turret with the tread-surfaces of said carriers positioned below said base.

4. A traveling automobile turn table comprising in combination, a circular base, mobility wheels for said base positioned within the circumference thereof disposed to prevent a tilting movement of said base, a rectangular turret revolubly mounted upon said base, and automobile carriers carried and fully supported directly by said turret with their tread-surfaces positioned below the upper surface of said base.

5. A traveling automobile turn table comprising in combination, a base, mobility wheels for said base, a turret revolubly mounted upon said base, and automobile carriers carried directly by said turret, with their tread-surfaces positioned below the upper surface of said turret, and fully supported thereby.

6. A traveling automobile turn table comprising in combination, a circular base, mobility wheels for said base positioned within the circumference thereof, a rectangular turret revolubly mounted upon said base, and automobile carriers carried directly by said turret with their tread-surfaces positioned below the upper surface of said turret and fully supported thereby.

In testimony whereof I affix my signature in presence of two witnesses.

RICHARD B. ISEMAN.

Witnesses:
ULRICH A. ABRAHAMS,
W. F. MOYAR.

Copies of this patent may be obtained for five cents each, by addressing the "Commissioner of Patents, Washington, D. C."